J. A. DUNCAN, Jr.
CAMERA SHUTTER.
APPLICATION FILED NOV. 14, 1912.
1,117,009.
Patented Nov. 10, 1914.
2 SHEETS—SHEET 1.
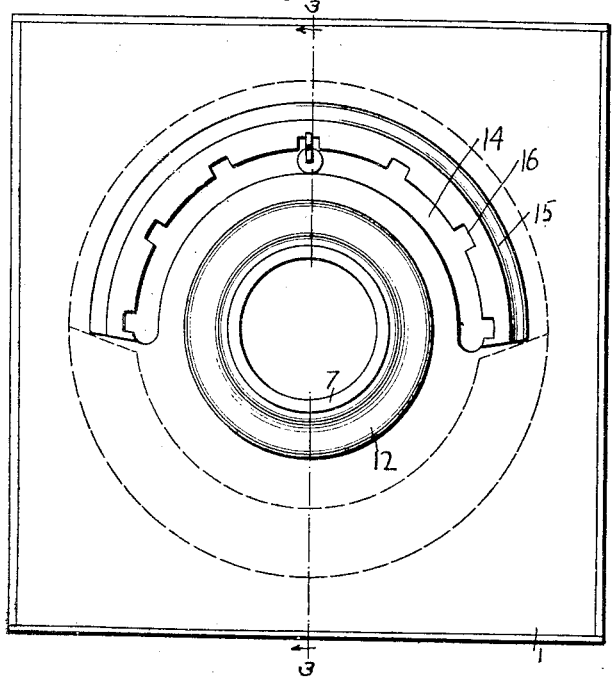
Fig. 1.
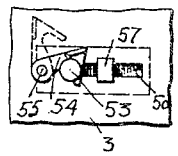
Fig. 6.
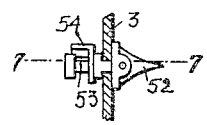
Fig. 7.
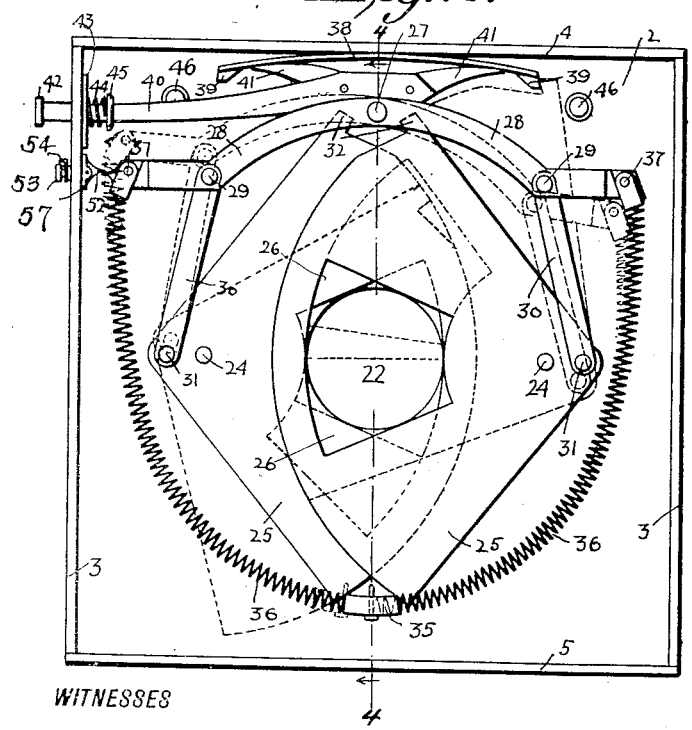
Fig. 2.
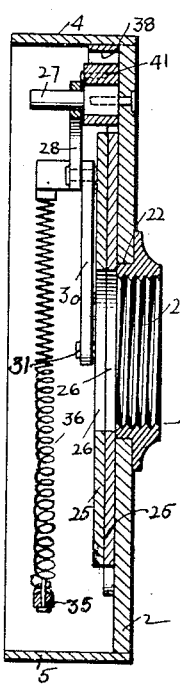
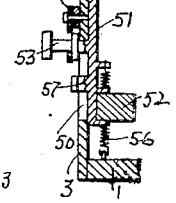
Fig. 3.
Fig. 4.
WITNESSES
Oliver W. Holmes
INVENTOR
JOHN A. DUNCAN, JR.
BY
ATTORNEYS J. A. DUNCAN, Jr.
CAMERA SHUTTER.
APPLICATION FILED NOV. 14, 1912.

1,117,009.

Patented Nov. 10, 1914.
2 SHEETS—SHEET 2.

WITNESSES
F. C. Barry
Chas. R. Wright

INVENTOR
JOHN A. DUNCAN, Jr.
BY Munn & Co.

ATTORNEYS

UNITED STATES PATENT OFFICE.

JOHN A. DUNCAN, JR., OF ST. JOSEPH, MISSOURI.

CAMERA-SHUTTER.

1,117,009.  Specification of Letters Patent.  Patented Nov. 10, 1914.

Application filed November 14, 1912. Serial No. 731,333.

*To all whom it may concern:*

Be it known that I, JOHN A. DUNCAN, Jr., a citizen of the United States, and a resident of St. Joseph, in the county of Buchanan and State of Missouri, have invented a new and Improved Camera-Shutter, of which the following is a full, clear, and exact description.

This invention relates to camera shutters, and is particularly directed to improvements whereby pictures may be taken in the shortest possible space of time, the construction being such that a maximum of light in a given interval is admitted to the camera.

The construction also embodies improvements whereby the speed at which the shutter operates can be quickly adjusted for either instantaneous or time exposures.

The invention further contemplates a structure which can be operated in front of, between, or behind the camera lenses, being also adapted for use as an attachment to cameras.

The particular construction set forth is capable of modification in many of the details, whereby the functions outlined can be performed, the particular embodiment set forth being merely preferred.

Reference is to be had to the accompanying drawings forming a part of this specification, in which like characters of reference indicate corresponding parts in all the views, and in which—

Figure 3:
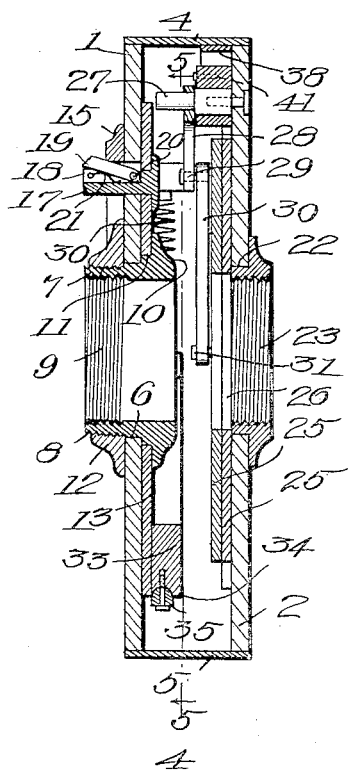
Figure 5:
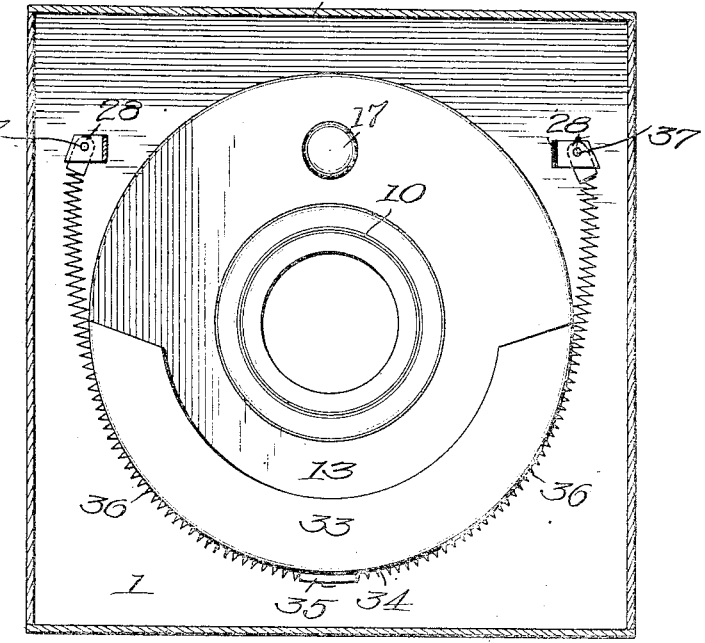

Figure 1 is a front view of the construction embodying the invention; Fig. 2 is an interior view with the front removed; Fig. 3 is a sectional view on the line 3—3 of Fig. 1; Fig. 4 is a sectional view on the line 4—4 of Fig. 2; Fig. 5 is a sectional view on line 5—5 of Fig. 3, while Figs. 6, 7 and 8 illustrate details of the mechanism for stopping the shutters in a determined position in order to permit time exposures.

The construction shown embodies a casing consisting essentially of the front 1, back 2, sides 3, top 4, and bottom 5, the actuating mechanism being contained within the casing, whereby a compact and portable mechanism is provided.

The front 1 is provided with an opening 6 into which the tube 7 is entered, the front portion of the tube being exteriorly threaded at 8 and interiorly threaded at 9, the rear portion thereof being provided with a shoulder 10 and an intermediate shoulder 11. The interior threads 9 are adapted to receive the ring containing the lens, the exterior threads 8 having a fixed ring 12 thereon bearing against the front 1 whereby the parts are held in position.

Referring particularly to Fig. 3, it will be noted that the intermediate shoulder 11 is closely adjacent the rear side of the front 1, the shoulder 10 being spaced from the front a distance sufficient to movably support a plate 13 on the said shoulder 11. The front 1 is further provided with an arcuate slot 14, adjacent which is a partial ring 15 having a number of notches 16 therein; referring particularly to Fig. 3, it will be noted that a pin 17 secured to the said plate 13 extends through the said arcuate slot 14, being thereby accessible outside of the casing, this pin being provided with a channel 18 and a finger 19 pivotally mounted at 20 within the slot, a leaf spring 21, also within the said slot, maintaining the pin in the position shown in Fig. 3, in engagement in any one of the notches 16 adjacent the said slot.

Referring now to Figs. 2 and 4, the back 2 of the casing is provided with an opening 22 into which the threaded ring 23 is entered, which ring is adapted to receive a lens, if so desired. Closely adjacent the said back and pivotally supported on the pins 24 are the blades 25, coöperatively forming a shutter, each of the blades being provided with a segmental opening 26, the limits of which are determined by drawing arcs, as shown, with the pins 24 as centers, the bounding lines of the said openings being tangents to the periphery of the opening 22 and touching the said pins 24. Movably mounted on a support 27 is a lever made up of the arms 28, each of the arms carrying pins 29 with which the links 30 are engaged, the other ends of the links engaging the said blades 25 at the pivotal points 31. It is to be noted from Fig. 2 that the upper corner portion of each one of the blades is provided with an offset 32, the particular purpose of which will be presently set forth.

Referring now to Figs. 2, 3 and 5, the lower portion of the plate 13 is provided with a shoulder 33 having a groove 34 therein; fixed to this shoulder 33, and in such a position that when the blades are in the position shown in Fig. 2 it lies vertically under the said opening 22, is a lug 35 having helical springs 36 secured to its ends, the springs lying in the groove 34 and having their other ends in pivotal engagement at 37 with the ends of the said arms 28. The use of the lug and the springs 36 does not necessarily require the particular structure shown, as a continuous spring may be availed of, merely secured to the said shoulder 33, the particular purpose of the springs 36 contemplating that in the position shown in Fig. 2 the effect of each neutralizes the other. Fixed within the casing, and preferably to the top 4, and of a width substantially equal to the combined widths of the blades 25, is a flat spring 38 secured at a middle point, the ends thereof being provided with lugs 39; pivotally mounted on the said pin 27 is a lever 40 having the oppositely extending arms 41 lying adjacent the ends of the said spring, this lever 40 extending without the casing through an opening in the side 3, and being preferably provided with a fingerhold 42 at its end. In order to permit an up and down movement of the lever 40 about the pin 27, and at the same time prevent the admission of light to the interior of the casing, the opening in the side 3 is covered by means of a plate 43, moving with the said lever 40, and maintained in close engagement with the said side by means of a spring 44 carried on the lever, having one end fixed thereto in any suitable manner, as against a shoulder 45. Extending laterally from the back 2 are stops 46 adapted to engage the said blades 25 under certain conditions to be now set forth.

With the pin 17 (Fig. 3) in the middle notch 16, as shown in Fig. 1, the point of attachment of the springs 36 to the said shoulder 33 permits the blades 25 to lie in the position shown in Fig. 2, with the openings 26 therein in register so that light is continuously permitted to enter the casing through the openings provided; that is, any spring 36, or any portion of one spring if one is used, overbalances the other portion of the same spring, the result being that in this central position the blades are as shown. If now the pin 17 is moved toward the right or left of Fig. 1 in order to carry it adjacent other notches 16, either one of the springs 36 will be placed under tension, whereby pressure will be exerted at one end of the arms 28, the result being that the upward movement of one end of one arm will carry one blade upwardly, and the opposite or downward movement of the other end of the other arm will carry the other blade downwardly; referring particularly to Fig. 2, the position of the pin 17 is such that the offset or shoulder 32 at the corner of the blade to the right engages with the offset or lug 39 at the outer end of the spring 38, as indicated in broken lines in Fig. 2. In such position of the parts the openings 26 in the blades are out of register, and the admission of light into the casing or through the lens is prevented, the stop 46 limiting the travel of this blade. If now it is desired to make an instantaneous exposure, the pin 17 is moved to the other side of the arcuate slot 14 in the front 1 and brought into engagement with one of the notches 16, the particular notch engaged depending on the speed at which it is desired to have the blades move in order to admit more or less light, such movement of the pin placing the other spring 36 under tension; if now the outer end of the lever 40 is moved downwardly, one of the arms 41 carried by this lever will move one end portion of the spring 38 upwardly (in this instance the right one), whereby the engagement between the shoulders or lugs 32 and 39 is broken, the consequence being that the tension of the spring moves this blade downwardly, which movement is imparted to the arms 28, the consequence being that the other blade is moved upwardly until it engages the other stop 46 and the offset 32 at its upper corner engages the lug 39 at the left end of the spring 38. The tension present in the particular spring under tension determines the rapidity with which the blades will move and thereby determines the amount of light which will be admitted through the opening 6 into the casing during the exposure; since these openings 26 are of particular form, that is, segmental, and since the shutters are moving in opposite directions, the light will be admitted for the longest space of time through the central axis of the lens positioned in the said opening, which is desirable, inasmuch as such central axis represents the point where the cones come together.

In order to provide for time exposure the mechanism shown in detail in Figs. 6, 7 and 8 is availed of. The side 3 is provided with an opening 50, and inside the casing and closely adjacent the opening, is a plate 51 carrying a knife-edge 52, the plate being movable to different positions through the medium of the arm 53 extending therefrom and through the said opening 50. The knife-edge 52 is maintained in operative position, as shown in Figs. 6 and 8, by means of a hook 54 pivotally mounted at 55 to the outside of the casing, the hook engaging the said arm 53 in order to maintain the knife-edge 52 in the path of the end of the arm 28, as shown particularly in Fig. 2, so that after the blades 25 have moved to a certain angle in order to fully uncover the opening adjacent the lens, the engagement of the said knife-edge and arm maintains the blades in such position, the blades continuing their movement after the determined interval of time through the release of the said hook 54 into the broken line position of Fig. 6, whereby the plate 51 may be moved toward the right under the influence of the spring 56 contained within the casing, the result being that the knife-edge 52 is brought out of engagement and out of the path of travel of the said end of the arm 28. This spring 56 moves the knife-edge in inoperative position, the hook 54 being used to bring it into operative position, as described, the movement of the plate 51 being preferably guided through the medium of the shoulder 57 which extends through the said opening 50.

The construction illustrated and described sets forth a new and improved camera shutter especially adapted for the performance of the functions set forth at the beginning of the specification; the provision of the springs 36 in addition to providing motive power for the blades, also act as buffers whereby vibration and shock in the operation of the parts are taken up, thereby providing for better photographs, inasmuch as movement of the camera, due to such shock or vibration is avoided.

Having thus described my invention, what I claim as new and desire to secure by Letters Patent is:—

1. In a structure of the class described, the combination of juxtaposed blades pivotally mounted in position, each blade being provided with an opening, the said openings coming into register during a portion of the movements of the said blades, a centrally pivoted lever, and means between each of the blades and the lever whereby movement of the ends of the lever in one direction moves the blades in certain directions, movement of the lever in an opposite direction moving the blades in opposite directions.

2. In a structure of the class described, pivotally mounted blades provided with openings adapted to register during a portion of the movements thereof, a rocking and spring actuated member having each end pivotally connected with a blade, and means for controlling the action of the spring on said member.

3. In a structure of the class described, pivotally mounted blades provided with openings adapted to register during a portion of the movements thereof, a rocking member pivotally connected with each blade, an adjustable member, and a spring connection between the adjustable member and the ends of the rocking member.

4. In a structure of the class described, the combination of a plurality of blades provided with openings, said blades being juxtaposed and being pivotally mounted in position, a lever, connections between each blade and the lever, a fixed support, and springs extending between each end of the lever and the said support, the springs being adapted to be alternately expanded, whereby pressure is applied to one end of the said lever, thereby moving the blades.

5. In a structure of the class described, the combination of a plurality of blades provided with openings, the said blades lying adjacent each other and being pivotally mounted in position, the said openings being adapted to register during a portion of the movement of the said blades, connecting means between the ends of the lever and the blades, a spring connected to the ends of the lever, and a movable support engaging the spring at an intermediate point, whereby either portion of the spring may be placed under tension, thereby moving the blades.

6. In a structure of the class described, the combination of juxtaposed blades provided with openings and pivotally mounted in position, a lever, links connected to opposite ends of the lever, the links being also connected to the blades, a spring connecting the ends of the lever, an adjustable support engaging an intermediate portion of the spring, movement of the support in either direction placing one portion of the spring under tension, whereby the blades are moved, and a stop for engaging one of the blades, whereby they are held in position.

7. In a structure of the class described, the combination of a plurality of juxtaposed blades provided with openings, the blades being pivotally mounted in position and adapted to move in opposite directions whereby the said openings come into register, a lever pivotally mounted in position, links connecting the blades and the ends of the lever, a spring connecting the ends of the lever, a movable support engaging an intermediate portion of the spring, stops on the blades, movable stops adapted to engage the said stops on the blades, and means whereby the said support may be moved in either direction in order to place either portion of the said spring under tension, whereby when the said stops are brought out of engagement the said blades will be moved.

8. In a structure of the class described, the combination of a plate revolubly mounted in position, a plurality of blades pivotally mounted in position, each of the blades being formed with an opening adapted to register, whereby light is admitted to the interior of the camera, a lever, the ends of the lever being connected to the blades, stops on the blades, a spring connected to the ends of the lever, an intermediate portion of the spring being connected to the said plate, other stops adapted for engagement with the stops on the blades, means whereby the said plate may be turned in order to place either spring under tension, and an operating lever adapted to bring about disengagement between the said coöperating stops, whereby the tension of the spring will cause the blades to move in opposite directions.

9. In a structure of the class described, the combination of a casing provided with a slot, stops adjacent the said slot, a plate mounted to oscillate, a pin carried by the plate extending through the said slot, means carried by the pin adapted to engage in one of the stops, a plurality of blades pivotally mounted in position, the blades being provided with openings adapted to come into register, each of the blades being provided with an offset, a lever, the ends of the lever being connected to the said plate, resiliently mounted stops adapted to coöperate with the offsets on the said blades, whereby they are held in certain positions, a spring connected to the ends of the lever, the intermediate portion of the spring engaging the said plate, whereby movement of the plate will place either portion of the spring under tension, and an operating lever for bringing about disengagement between the said offsets and the said stops, whereby the blades are moved in opposite directions.

10. In a structure of the class described, the combination of a plurality of oppositely movable blades provided with openings pivotally mounted in position, a lever, the ends of the lever being connected to the blades, a spring connecting the ends of the lever, a support connected to an intermediate point of the spring, means whereby the support may be moved in opposite directions in order to place either portion of the spring under tension, offsets on the blades, movable stops adapted to coöperate with the offsets, an operating lever for disengaging a stop and an offset whereby the blades are moved in opposite directions, together with a movable element adapted to engage one end of the said lever when the openings in the blades are in register, thereby stopping the blades and permitting a time exposure.

11. In a structure of the class described, the combination of a plurality of oppositely movable blades provided with openings coöperatively permitting light to enter the camera, offsets on the blades, movable stops for coöperation with the said offsets, a lever pivotally mounted in position at an intermediate point, the ends of the lever being connected to the blades, a spring connecting the ends of the lever, a support connected to an intermediate portion of the spring, means whereby the support may be moved in either direction in order to place either portion of the spring under tension, the engagement of one of the offsets with one of the stops preventing movement of the blades, a lever pivotally mounted in position and adapted to bring about disengagement of the said offset and stop whereby the blades are permitted to move, together with a slidable element carried by the casing adapted to be moved into the path of travel of the end of the said lever and engaged therewith for stopping the blades when the openings therein are in register, movement of the said element relatively to the end of the lever permitting the blades to continue their movement, whereby the openings come out of register.

In testimony whereof I have signed my name to this specification in the presence of two subscribing witnesses.

JOHN A. DUNCAN, JR.

Witnesses:
JOHN S. CLINKINBEARD,
L. GRANT DUNCAN.